(12) United States Patent
Ghoshal et al.

(10) Patent No.: US 9,198,045 B1
(45) Date of Patent: Nov. 24, 2015

(54) MOBILE COMMUNICATION DEVICE REMOTE UNLOCK SYSTEM AND METHOD

(71) Applicant: Sprint Communications Company L.P., Overland Park, KS (US)

(72) Inventors: Jagannath Ghoshal, Overland Park, KS (US); Bret D. Sumner, Lawrence, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/285,621

(22) Filed: May 22, 2014

(51) Int. Cl.
*H04W 12/08* (2009.01)

(52) U.S. Cl.
CPC ..................... *H04W 12/08* (2013.01)

(58) Field of Classification Search
CPC ..... H04W 12/08; H04W 12/06; H04W 84/12; H04W 88/08; H04W 4/001; H04W 48/02
USPC .......................... 455/418–420, 410–411, 433, 455/435.1–435.2
See application file for complete search history.

(56) References Cited

U.S. PATENT DOCUMENTS

| 2008/0108321 | A1* | 5/2008 | Taaghol et al. ............... 455/410 |
| 2014/0155038 | A1* | 6/2014 | Fan et al. ...................... 455/411 |

* cited by examiner

*Primary Examiner* — Brandon Miller

(57) ABSTRACT

A method of maintaining a lock state of a mobile communication device is disclosed. The method comprises a provisioning server receiving a request to unlock a mobile communication device. The method further comprises, in response to the request, the provisioning server provisioning the mobile communication device with a payload. The payload comprises unlock instructions to be executed, and a list of pre-approved telecommunications service providers. The payload further comprises instructions that lock the device if the mobile communication device attempts to activate or connect to a service provider that is not identified in the list of pre-approved service providers. The payload further comprises instructions to block attempts by applications installed on the mobile communication device to connect to a domestic network while the mobile communication device is communicatively coupled to a foreign network.

20 Claims, 7 Drawing Sheets

MOBILE COMMUNICATION DEVICE REMOTE UNLOCK SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many telecommunication service providers subsidize purchase of mobile communication devices by their subscribers. Instead of selling mobile communication devices for full price to potential subscribers, telecommunication service providers may subsidize the mobile communication devices and sell the device at a reduced rate to entice potential subscribers to purchase their services and/or products. When potential subscribers finally purchase the mobile communication device and become subscribers, the subsidized mobile communication device that is sold to them is a device in a locked state. When the mobile communication device is in a locked state, it is unable to communicatively couple with any other radio access networks of telecommunication service providers. If the device were unlocked, it would be able to communicatively couple with radio access networks of other telecommunications service providers, and the subsidy payback potential might be reduced or eliminated for the provider. If a subscriber wishes to travel abroad, subscribers may request that his or her telecommunications service provider unlock the mobile communication device.

SUMMARY

In an embodiment, a mobile communication device is disclosed. The mobile communication device comprises a processor, a memory, and an application stored in the memory. The application, when executed by the processor writes a list of non-approved mobile communication service providers to the memory. The application unlocks the mobile communication device during a first execution of the application, wherein an unlocked mobile communication device is configured to be able to connect to the radio access network of any mobile communication service provider and a locked mobile communication device is configured to restrict the mobile communication device to connecting to the radio access network of a primary mobile communication service provider, wherein when the mobile communication device is in a lock state the mobile communication device is not able to communicate with different radio access networks, wherein a mobile communication device that is in an unlock state is able to communicate with other radio access networks. The application determines if the mobile communication device attempts to activate on a radio access network of a mobile communication service provider that is not the primary mobile communication service provider and is not identified in the list of non-approved mobile communication service providers. The application locks the mobile communication device if the mobile communication device attempts to connect to the radio access network of a non-approved mobile communication service provider.

In an embodiment, a method of maintaining a lock state of a mobile communication device is disclosed. The method comprises a provisioning server receiving a request to unlock a mobile communication device. The method further comprises in response to receiving the request, the provisioning server provisioning the mobile communication device with a payload, wherein the payload comprises unlock instructions to be executed, a list of pre-approved service providers, and instructions that lock the device if the mobile communication device attempts to activate or connect to a service provider that is not identified in the list or pre-approved service providers. The method further comprises the provisioning server transmitting the payload to the mobile communication device.

In an embodiment, a method of maintaining a lock state of a mobile communication device is disclosed. The method comprises a provisioning server receiving a request to unlock a mobile communication device. The method further comprises in response to the request, the provisioning server provisioning the mobile communication device with a payload, wherein the payload comprises unlock instructions to be executed, and instructions to block attempts by applications installed on the mobile communication device to connect to a domestic network while the mobile communication device is communicatively coupled to a foreign network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
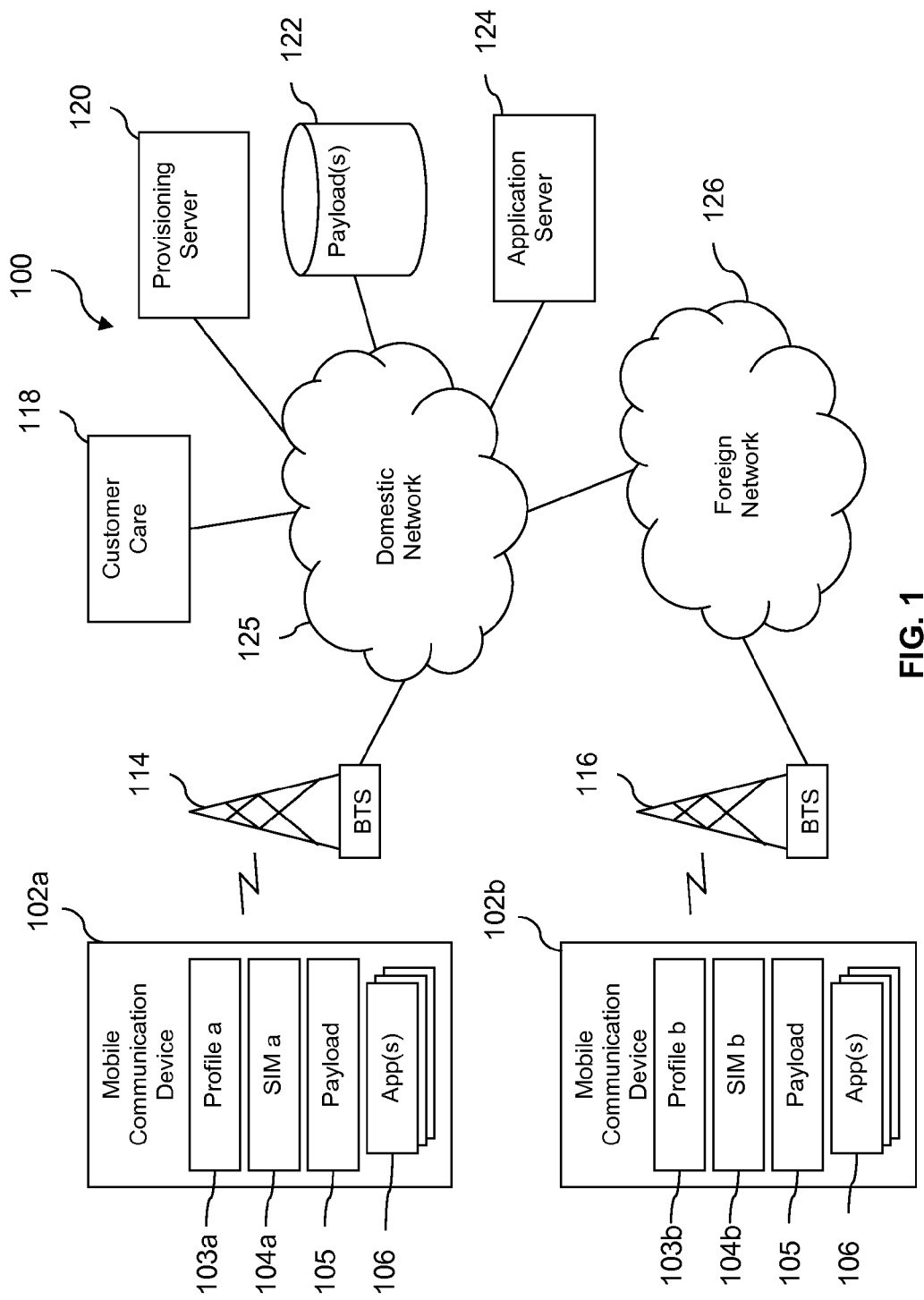
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Subscribers that travel abroad may present issues for telecommunications service providers. Telecommunications service providers may lock subscribers' mobile communication devices that they subsidize. When subscribers wish to travel abroad, subscribers may request their telecommunications service providers to unlock their mobile communication devices so they can use their mobile communication devices out-of-country on a foreign network. With the mobile communication devices unlocked, however, telecommunications service providers cannot prevent subscribers from migrating their subsidized and now unlocked devices to a domestic competitor's telecommunications service plan. Additionally, while a mobile communication device is communicatively coupled with a foreign network, user applications on the phone may automatically attempt to re-connect with application support servers that are located on a domestic network which may prove a burden on both networks.

A mobile communication device may be said to be locked when the device cannot be used on another service provider's network. For example, if a device provisioned for wireless cellular communication service using a first wireless service provider is locked, the device may be prevented from being provisioned onto a second wireless service provider's network, for example merely by swapping out a subscriber identification module (SIM) card associated with the first wireless service provider for a SIM card associated with the second wireless service provider. By contrast, a mobile communication device that is unlocked and provisioned for wireless cellular communication service using the first wireless service provider may be allowed to provision onto a second wireless service provider's network, for example by swapping out a SIM card associated with the first wireless service provider for a SIM card associated with the second wireless service provider. It is understood that a locked mobile communication device may receive roaming wireless communication service from the second wireless service provider without being provisioned onto the second wireless service provider's network. The terms locked and unlocked as used with reference to mobile communication devices, for example with reference to mobile phones, are well known and understood by those of skill in the art. Software and/or firmware installed in the mobile communication device may provide the lock restrictions.

The present disclosure teaches a mechanism to unlock the mobile communication device using an update payload. The mobile communication device receives and installs the payload. When the payload is processed by an update component, the payload unlocks the mobile communication device. In addition to unlocking the device, the payload also installs monitoring software on the device. When executed, the monitoring software determines if the mobile communication device attempts to activate on a disallowed network which may be associated with a direct competitor of a telecommunications service provider and may re-lock the device if the device attempts to do so. Alternatively, the monitoring software may allow activation on networks that are white-listed on an approved carrier list and re-lock if activation is attempted on a network or carrier not identified on the white list, wherein the white list may represent approved telecommunications service providers as an alternative to the primary telecommunications service provider. The monitoring software also blocks attempts by user applications on the mobile communication device when the device is communicatively coupled with a foreign network to connect via the domestic network to application support servers, for example an attempt by a user installed application to establish a data connection back to an associated application support server attached to the domestic network. With the payload that comprises monitoring software, abuse of unlocked mobile communication devices may be avoided and burden on data networks may be lessened.

Turning now to FIG. 1, a communication system 100 is described. The system 100 comprises a mobile communication device 102a. The mobile communication device 102a comprises a profile 103a, a subscriber identity module card 104a, a payload 105, and a plurality of applications 106. The system 100 further comprises a mobile communication device 102b. The mobile communication device 102b comprises a profile 103b, a subscriber identity module card 104b, the payload 105, and the plurality of applications 106. The system 100 further comprises two base transceiver stations 114, 116. The system 100 further comprises a customer care work station 118, a provisioning server 120, a payload data store 122, and an application support server 124. The system 100 further comprises a domestic network 125, and a foreign network 126. In an embodiment, the mobile communication device 102a/102b is one of a mobile phone, a personal digital assistant, or a media player. In an embodiment, the mobile communication device 102a/102b may be implemented as handset. Details of handsets are discussed further hereinafter.

In an embodiment, the mobile communication device 102b is the same device as the mobile communication device 102a, but the mobile communication device 102b is a reconfigured version of the mobile communication device 102a. The profile 103a may be reconfigured to the profile 103b with the configuration of the mobile communication device 102a to the mobile communication device 102b via the download and processing of the payload 105. Execution of the payload 105 upon power up of the mobile communication device 102a may configure the mobile communication device 102a to the mobile communication device 102b and provision the mobile communication device 102b with unlock instructions to be executed, a list of pre-approved telecommunications service providers, a list of non-approved telecommunications service providers, and instructions to block attempts by the plurality of applications 106 to connect with the application support server 124 via the domestic network 125 while it is communicatively coupled with the foreign network 126. In an embodiment, the mobile communication device 102a/102b does not block attempts to connect to the application support server when the mobile communication device 102a/102b is connected to the domestic network. The profile 103b may comprise a list of radio access networks that the mobile communication device 102b is capable of communicatively coupling with such as the domestic network 125 and the foreign network 126 illustrated in FIG. 1. In an embodiment, the subscriber identity module card 104a may be replaced by the subscriber identity module card 104b by a subscriber when the mobile communication device 102a/102b is abroad in order to communicatively couple with a radio access network such as the foreign network 126. In an embodiment, the payload 105 reconfigures the profile 103a to the profile 103b and may replace the functionality of the subscriber identity module card 104b.

In an embodiment, the base transceiver stations 114, 116 may provide a wireless communication link to the mobile communication device 102a/102b. In an embodiment, the base transceiver stations 114. 116 may provide a wireless communication link to the mobile communication device 102a/102b according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol.

While one mobile communication device 102a/102b and two base transceiver stations 114, 116 are illustrated in FIG. 1, it is understood that the system 100 may comprise any number of base transceiver stations or mobile communication devices.

In an embodiment, the mobile communication device 102a, the base transceiver station 114, the customer care work station 118, the provisioning server 120, the payload data store 122, and the application support server 124 are communicatively coupled with the domestic network 125. In an embodiment, the mobile communication device 102b and the base transceiver station 116 are communicatively coupled with the foreign network 126. The mobile communication device 102b, when communicatively coupled with the foreign network 126, is representative of the mobile communication device 102b while it is abroad. In an embodiment, the domestic network 125 and the foreign network 126 are private communication networks, public communication networks or a combination thereof. While two networks 125, 126 are illustrated in FIG. 1, both of the networks 125, 126 may be a part of the same cloud network. While two networks 125, 126 are illustrated in FIG. 1, there may be more networks that may function as a part of the system 100.

In an embodiment, the customer care work station 118 receives requests from subscribers that may request to have their mobile communication devices such as the mobile communication device 102a unlocked. The provisioning server 120 may receive requests relayed by the customer care work station 118. Once the provisioning server 120 receives the request from the customer care work station 118, the provisioning server 120 may access the payload data store 122 and send the payload 105 to the mobile communication device 102a. Alternatively, the customer care work station 118 may send a message to an application on the mobile communication device 102a to inform the application that an update payload is available. The application may then retrieve the payload from the payload data store 122 and execute and/or install the payload. In an embodiment, the subject application may be an open mobile alliance device management (OMA-DM) client application, the payload may be an OMA-DM payload, and the payload data store 122 may be an OMA-DM server or an OMA-DM payload data store.

Once the mobile communication device 102a receives the payload 105 from the payload data store 122, the mobile communication device 102a configures itself by the payload 105 and modifies the profile 103a to the profile 103b which is that of an unlocked mobile communication device as represented by the mobile communication device 102b which is the same mobile communication device as mobile communication device 102a, but configured to be an unlocked mobile communication device with instructions to lock the device 102a/102b if it attempts to connect with a telecommunication service provider that is not amongst the pre-approved service providers and instructions to block attempts by the applications 106 to connect with the domestic network 125 while coupled with the foreign network 126. In an embodiment, the subscriber identity module card 104a may be replaced with the subscriber identity module card 104b in order to communicatively couple with a pre-approved telecommunications service provider as identified in the list of pre-approved telecommunications service providers listed by the payload 105.

For example, a subscriber may wish to travel from the United States to the United Kingdom. The subscriber may replace the subscriber identity module card that functions on domestic networks with a subscriber identity module card that functions on foreign networks. In order to utilize the new subscriber identity module card the subscriber may request to have his or her mobile communication device unlocked so that he or she may be able to use the mobile communication device with the new subscriber identity module card. Alternatively, a subscriber may travel to a location within the United States for an extended period of time that does not have access to the domestic network of a primary telecommunications service provider that the mobile communication device is associated with. The telecommunications service provider may unlock the subscriber's mobile communication device and allow the subscriber to use another network for the period of time that the subscriber specified with the understanding that the subscriber will again utilize the primary telecommunications service provider after the pre-determined period of time or after the user returns to the geographical area where the service provider provides coverage. The subscriber may not have to change the subscriber identity module card 104a as the configuration of the profile 103a to the profile 103b may be sufficient for identifying and communicatively coupling with a pre-approved telecommunications service provider on the pre-approved telecommunications service providers list provisioned by the payload 105.

In addition to unlocking the mobile communication device 102a and reconfiguring it the device 102a into the device 102b, the payload 105 provisions the mobile communication device 102b with a list of pre-approved (e.g., white listed) telecommunications service providers. Alternatively, the payload 105 may provision the mobile communication device 102b with a list of non-approved (e.g., black listed) telecommunications service providers. The payload 105 further provisions the mobile communication device 102b with instructions that lock the mobile communication device 102b if the device 102b attempts to activate or connect to a telecommunication service provider that is not identified in the list of pre-approved telecommunications service providers. Alternatively, the payload 105 may further provision the mobile communication device 102b with instructions that lock the mobile communication device 102b if the device 102b device attempts to activate or connect to a telecommunication service provider that is on the non-approved telecommunications service provider list. The payload 105 also provisions the mobile communication device 102b with instructions to block attempts by the plurality of applications 106 installed on the mobile communication device 102b to connect to the application support server 124 while communicatively coupled with the foreign network 126.

In an embodiment, a subscriber that uses the mobile communication device 102a may contact the customer care work station 118 and request that they unlock the mobile communication device 102a so they may travel abroad while utilizing the mobile communication device 102a. Once the customer care work station 118 receives the request, the customer care work station 118 may relay the request to the provisioning server 120. Once the provisioning server 120 receives the request from the customer care work station 118, the provisioning server 120 may access the payload data store 122. After the provisioning server 120 accesses the payload data store 122, the provisioning server 120 may provision the mobile communication device 102a with payload 105. In an embodiment, the provisioning server 120 may send a short message service (SMS) text message to the mobile communication device 102a informing the mobile communication device 102a that the payload 105 is available to be downloaded and may provide a link for the mobile communication device 102a to download the payload 105. In an embodiment, the mobile communication device 102a may access the payload 105 via an open mobile alliance device management (OMA DM) server, which is substantially similar to the provisioning server 120, via an OMA DM client that is stored in a memory of the mobile communication device 102a.

Once the mobile communication device 102a receives and installs the payload 105, the mobile communication device 102a may be rebooted. In an embodiment, the mobile communication device 102a may be rebooted automatically as it receives the payload 105 or it may be rebooted manually by the subscriber that utilizes the mobile communication device 102a. Once the mobile communication device 102a has been rebooted, upon power up of the mobile communication device 102a, the device 102a reconfigures itself using the payload 105 upon first processing and installation of the payload 105 into the mobile communication device 102b. In an embodiment, the payload 105 may provision the mobile communication device 102b with instructions to unlock the mobile communication device 102b and reconfigure it into the mobile communication device 102b. The payload 105 may also provision the device 102b with a list of pre-approved telecommunications service providers. The payload 105 may also provision the device 102b with instructions that lock the mobile communication device 102b if the mobile communication device 102b attempts to activate or connect to a service provider that is not identified in the list of pre-approved service providers. Alternatively, the payload may provision the mobile communication device 102b with a list of non-approved telecommunication service providers and instructions to lock the device 102b if the device 102b attempts to activate or connect to a service provider that is on the non-approved telecommunications service providers list. In an embodiment, the mobile communication device 102b determines if it is coupled to a non-approved mobile service communications provider upon boot-up of the mobile communication device 102b where the mobile communication device 102b checks the list of non-approved mobile service communications providers, if it is coupled to a non-approved radio access network, the mobile communication device 102b enters a lock state.

The payload 105 may also provision the mobile communication device 102b with instructions to block attempts by the plurality of applications 106 to connect to the domestic network 125 and the application support server 124 that is communicatively coupled to the domestic network 125, while the device 102b is communicatively coupled with the foreign network 126. In an embodiment, the plurality of applications 106 that may attempt to connect to the domestic network 125 while the mobile communication device 102b is communicatively coupled to the foreign network 126 may be deleted once the mobile communication device 102a receives the payload 105 and is reconfigured into the device 102b. Alternatively, the plurality of applications 106 that attempt to connect to the domestic network 125 while communicatively coupled with the foreign network 126 may be disabled until the mobile communication device 102b is communicatively coupled with the domestic network once again.

If the mobile communication device 102b determines that it has attempted to connect with a telecommunications service provider that is not on the list of pre-approved telecommunications service providers, the mobile communication device 102b enters a lock state. As part of the payload 105, monitoring software is installed onto the mobile communication device 102b, and the monitoring software enforces the instructions installed by the payload 105 to lock the mobile communication device 102b if it were to attempt to connect with a non-approved telecommunications service provider. In an embodiment, the subscriber that utilizes the mobile communication device 102b may only be able to contact emergency services (police, fire, medical, etc.) and the customer care work station 118 while in a locked state. If the subscriber contacts the customer care work station 118, he or she may be able to re-unlock the mobile communication device 102b. The subscriber may have a better understanding of which telecommunications service providers are pre-approved or alternatively, non-approved as they may ask the customer care work station 118 which telecommunications service providers are pre-approved or non-approved.

In an embodiment, the payload 105 may function in the form of an application that is stored in a memory of the mobile communication device 102a. A subscriber that utilizes the mobile communication device 102a may send a request to the customer care work station 118 that may relay the request to the provisioning server 120. The provisioning server 120 may access an application data store which is substantially similar to the payload data store 122. The provisioning server 120 may provision the application onto the mobile communication device 102a. Alternatively, the provisioning server 120 may send a short message service (SMS) text message that informs the mobile communication device 102a that the application is available for download and provide a link for the mobile communication device 102a to download the application.

In an embodiment, the mobile communication device 102a may be able to access and download the application via an open mobile alliance device management (OMA DM) client stored in the memory of the mobile communication device 102a that is in communication with an OMA DM server where the application may be downloaded. Upon first execution of the application on the mobile communication device 102a, the mobile communication device 102a is configured into the mobile communication device 102b. The application that executes on the mobile communication device 102b writes a list of pre-approved mobile communication service providers to the memory of the mobile communication device 102b, unlocks the mobile communication device 102b, wherein an unlocked mobile communication device is configured to connect to a radio access network of any mobile communication service provider and a locked mobile communication device is configured to restrict a mobile communication device from connecting to the radio access network of a primary mobile communication service provider. Alternatively, the application may write the list of pre-approved mobile service communications providers to the subscriber identity module card 104b that is executing on the mobile communication device 102b.

With the mobile communication device 102b configured, the application determines if the mobile communication device 102b attempts to activate on a radio access network of a mobile communication service provider that is not the primary mobile communication service provider and is not identified in the list of pre-approved mobile communication service providers. If the mobile communication device 102b attempts to connect to the radio access network of a non-approved mobile communication service provider, the mobile communication device 102b is locked.

Figure 2:
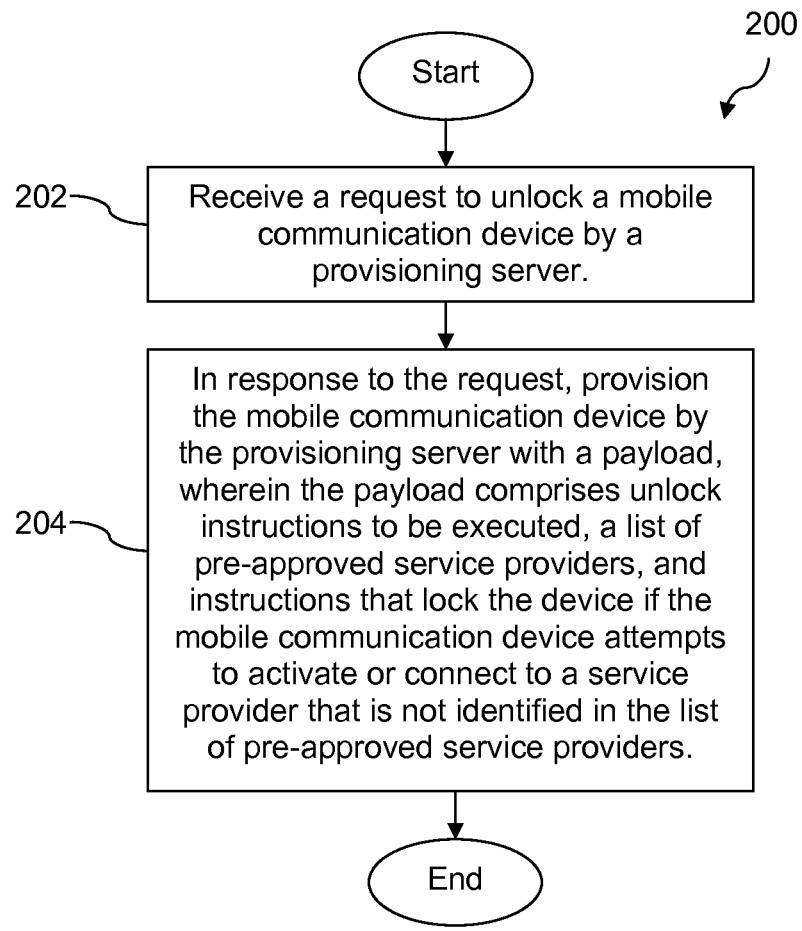
FIG. 2 is a flow chart of a method according to an embodiment of the disclosure.

In FIG. 2, a method 200 is described. At block 202, a provisioning server receives a request to unlock a mobile communication device. At block 204, in response to the request, the provisioning server provisions the mobile communication device with a payload, wherein the payload comprises unlock instructions to be executed, a list of pre-approved service providers, and instructions that lock the device if the mobile communication device attempts to activate or connect to a service provider that is not identified in the list of pre-approved service providers.

Figure 3:
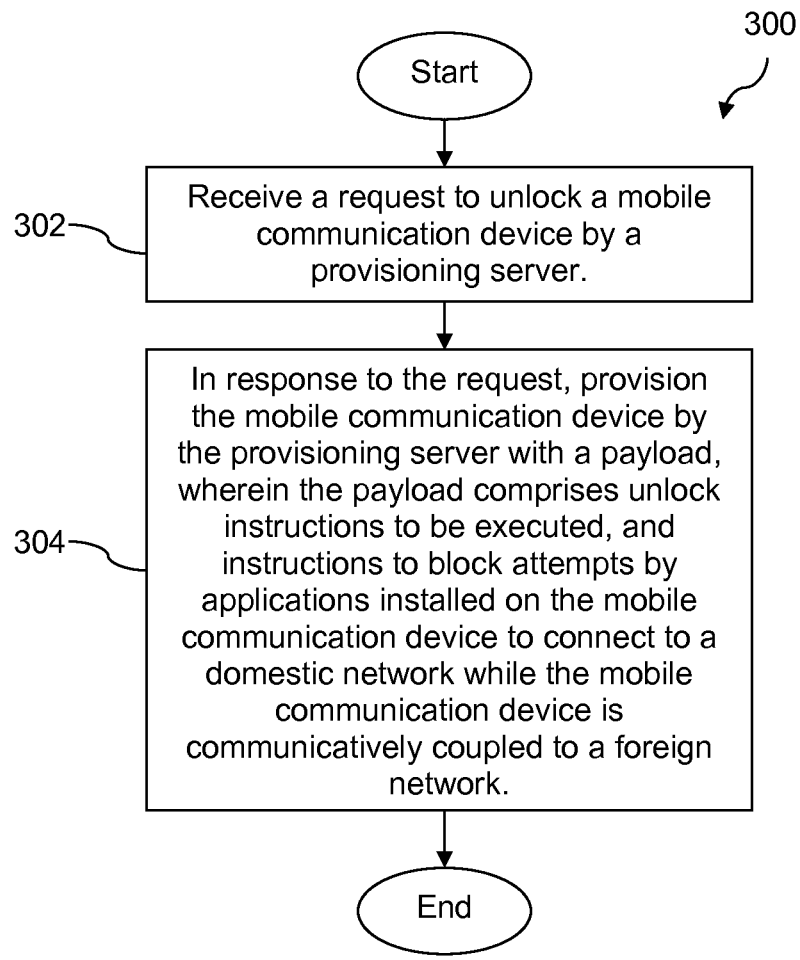
FIG. 3 is a flow chart of a method according to an embodiment of the disclosure.

In FIG. 3, a method 300 is described. At block 302, a provisioning server receives a request to unlock a mobile communication device. At block 304, in response to the request, the provisioning server provisions the mobile communication device with a payload, wherein the payload comprises unlock instructions to be executed, and instructions to block attempts by applications installed on the mobile communication device to connect to a domestic network while the mobile communication device is communicatively coupled to a foreign network.

Figure 4:
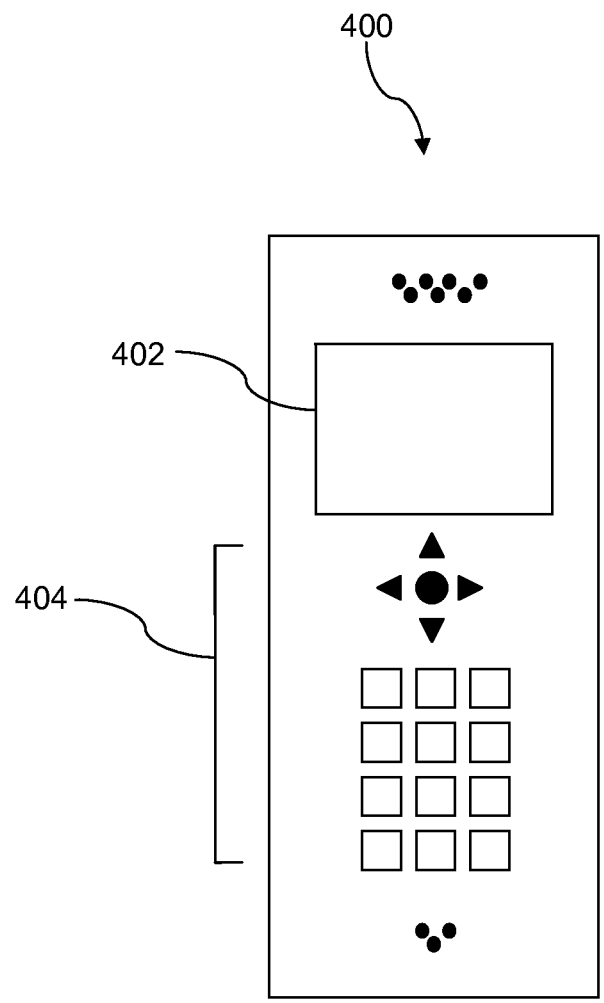
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
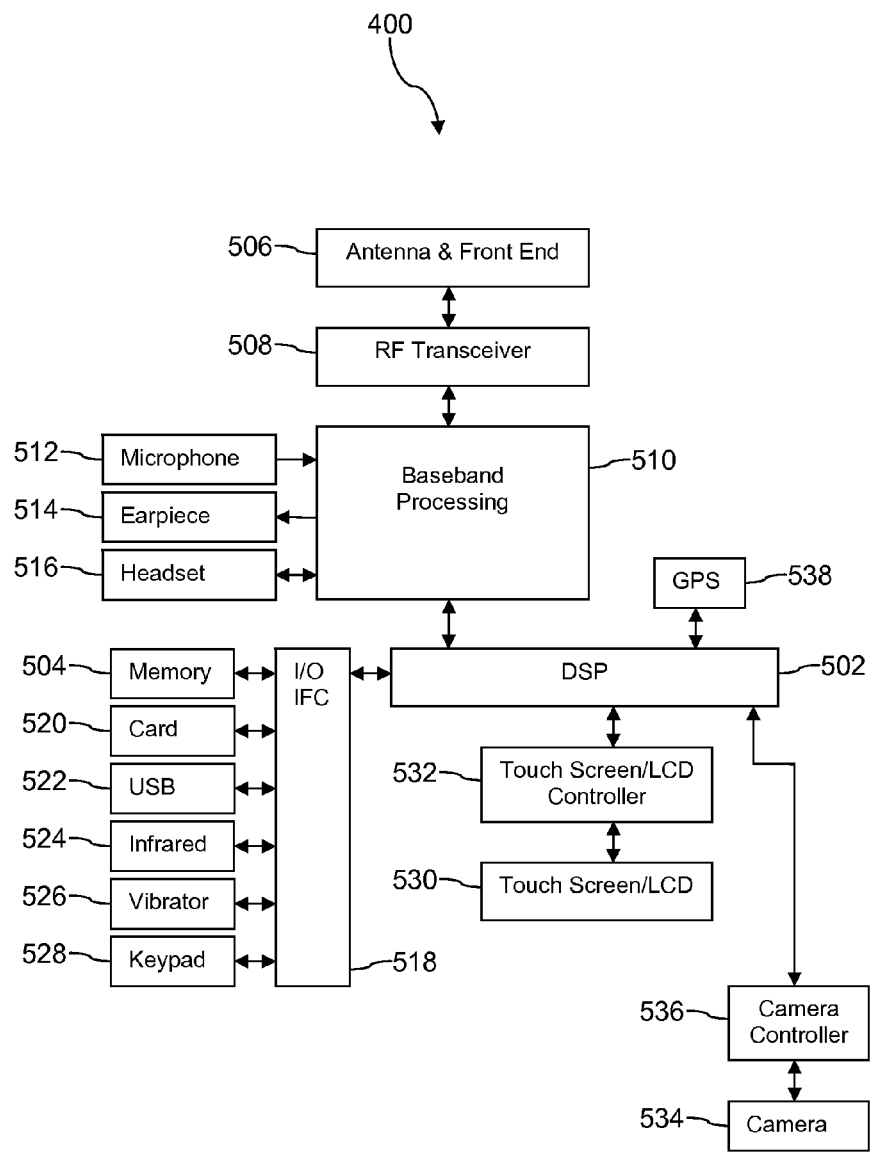
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
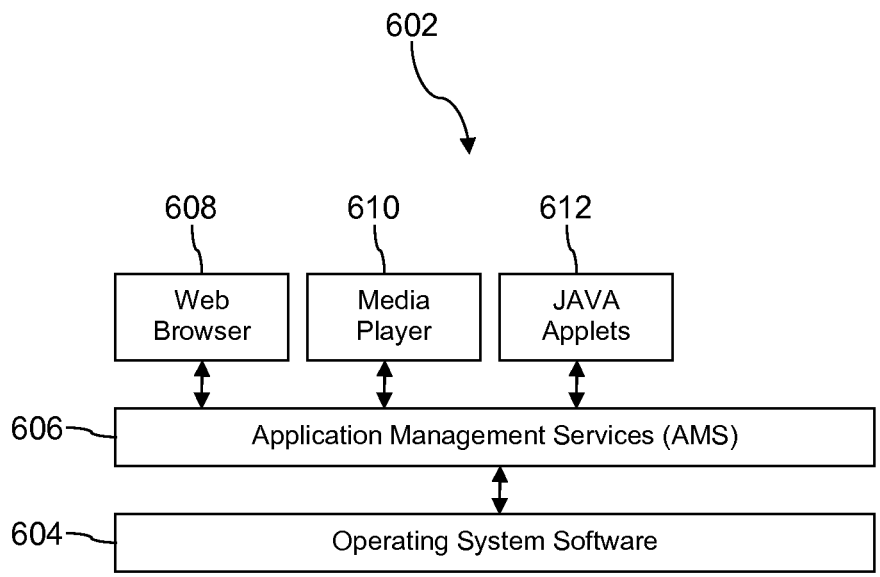
FIGS. 6A and 6B are block diagrams of software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
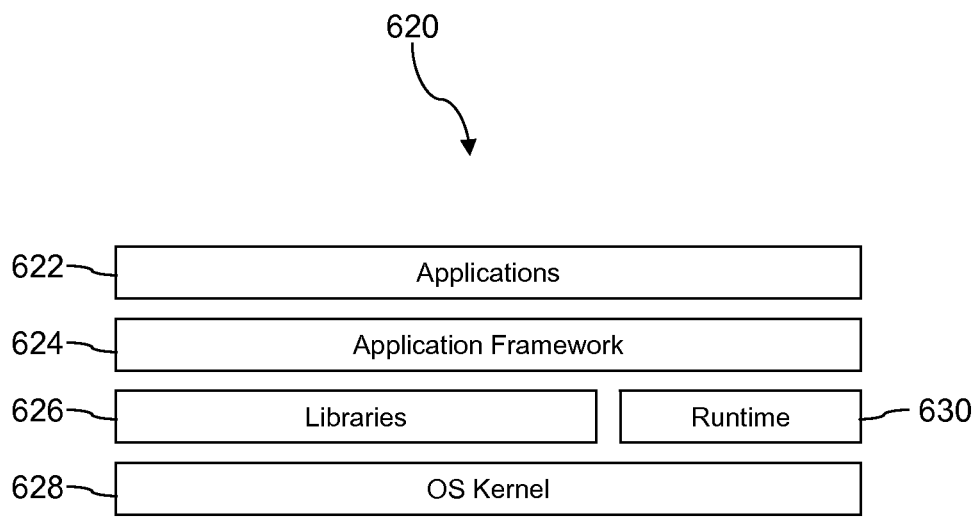

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
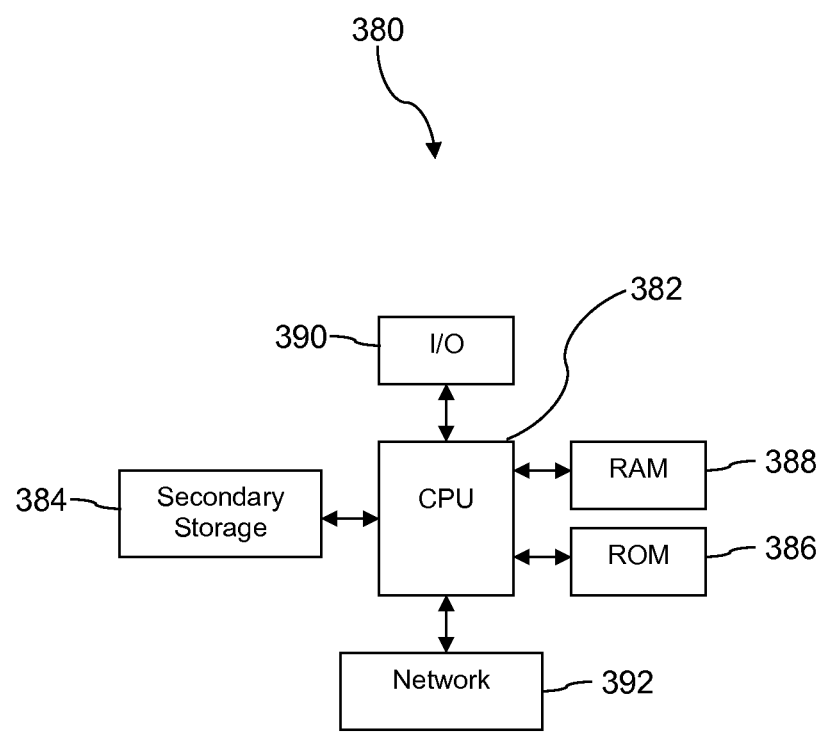
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising;
    a processor;
    a memory; and
    an application stored in the memory that, upon execution by the processor, configures the processor to:
        write a list of non-approved mobile communication service providers to the memory,
        unlock the mobile communication device during a first execution of the application, wherein an unlocked mobile communication device is configured to connect to a radio access network of any mobile communication service provider and a locked mobile communication device is configured to restrict the mobile communication device to connecting to the radio access network of a primary mobile communication service provider, wherein when the mobile communication device is in a lock state the mobile communication device is not able to communicate with different radio access networks, and wherein a mobile communication device that is in an unlock state is able to communicate with other radio access networks,
        determine that the mobile communication device is attempting to activate on a radio access network of a non-approved mobile communication service provider that is identified in the list of non-approved mobile communication service providers, and
        responsive to the mobile communication device attempts to connect to the radio access network of the non-approved mobile communication service provider, lock the mobile communication device.

2. The device of claim 1, wherein the application is provisioned on to the mobile communication device via a provisioning server, and wherein the mobile communication device is configured by instructions to block attempts of applications installed in the memory to connect to a server associated with the primary mobile communication service provider while the mobile device is communicatively coupled to a network not operated by the primary communication service provider.

3. The device of claim 1, wherein a provisioning server sends a short message service (SMS) text message that informs the mobile communication device that the application is available for download.

4. The device of claim 3, wherein the mobile communication device accesses and downloads the application via an open mobile alliance device management (OMA DM) client stored in the memory that is in communication with an OMA DM server where the application is downloaded.

5. The device of claim 1, wherein the application writes the list of non-approved mobile service communications providers to a profile that is stored in the memory.

6. The device of claim 1, wherein the application writes the list of non-approved mobile service communications providers to a subscriber identity module card that is executing on the mobile communication device.

7. The device of claim 1, wherein the mobile communication device determines if it is coupled to a non-approved mobile service communications provider upon boot-up of the mobile communication device where the mobile communication device checks the list of non-approved mobile service communications providers, the mobile communication device enters a lock state.

8. A method of maintaining a lock state of a mobile communication device, comprising:
receiving, on a processor at a provisioning server, a request to unlock a mobile communication device, and
in response to the request, provisioning the mobile communication device by the provisioning server with a payload, wherein the payload comprises unlock instructions to be executed on the mobile communication device, a list of pre-approved service providers, and instructions that lock the mobile communication device responsive to attempts on the mobile communication device to activate or connect to a service provider that is not identified in the list of pre-approved service providers.

9. The method of claim 8, wherein upon power up of the mobile communication device after the payload is installed, the mobile communication device determines if it is communicatively coupled to a pre-approved service provider.

10. The method of claim 8, wherein upon power up of the mobile communication device, if the device determines that is communicatively coupled with a non-approved service provider, the mobile communication device locks itself.

11. The method of claim 10, wherein if the mobile communication device is locked, the mobile communication device is permitted to make only emergency calls to civil services and pre-approved telecommunications service providers, wherein civil services includes police, fire, and ambulance.

12. The method of claim 8, wherein the provisioning server sends a short message service (SMS) text message that informs the mobile communication device that the payload is available for download.

13. The method of claim 12, wherein the mobile communication device accesses and downloads the payload via an open mobile alliance device management (OMA DM) client stored in the memory that is in communication with an OMA DM server where the payload is downloaded.

14. A method of maintaining a lock state of a mobile communication device, comprising:
receiving, on a processor at a provisioning server, a request to unlock a mobile communication device via a wireless network, and
in response to the request, provisioning the mobile communication device by the provisioning server with a payload via the wireless network, wherein the payload comprises unlock instructions that execute on the mobile communication device, and instructions that block attempts by applications installed on the mobile communication device to connect to a domestic network while the mobile communication device is communicatively coupled to a foreign network.

15. The method of claim 14, wherein the applications that attempt to connect to the domestic network while communicatively coupled with the foreign network are deleted on the mobile communication device in response to the instructions of the payload.

16. The method of claim 14, wherein the applications that attempt to connect to the domestic network while communicatively coupled with the foreign network are disabled until the mobile communication device is communicatively coupled with the domestic network.

17. The method of claim 14, wherein the mobile communication device does not block attempts by the applications while connected to the domestic network.

18. The method of claim 14, wherein the payload reconfigures a profile stored in a memory of the mobile communication device and replaces the functionality of a subscriber identity module card stored in the mobile communication device.

19. The method of claim 14, wherein the mobile communication device automatically reboots upon first execution of the payload after the payload has been provisioned to the mobile communication device by the provisioning server.

20. The method of claim 14, wherein the mobile communication device is manually rebooted upon a desired execution time of the payload after the payload has been provisioned to the mobile communication device by the provisioning server.

* * * * *